United States Patent
Huang

(10) Patent No.: US 12,125,241 B2
(45) Date of Patent: Oct. 22, 2024

(54) CAMERA ANGLE DETECTION METHOD AND RELATED SURVEILLANCE APPARATUS

(71) Applicant: VIVOTEK INC., New Taipei (TW)

(72) Inventor: Chao-Tan Huang, New Taipei (TW)

(73) Assignee: VIVOTEK INC., New Taipei (TW)

( * ) Notice: Subject to any disclaimer, the term of this patent is extended or adjusted under 35 U.S.C. 154(b) by 420 days.

(21) Appl. No.: 17/537,538

(22) Filed: Nov. 30, 2021

(65) Prior Publication Data

US 2022/0189064 A1  Jun. 16, 2022

(30) Foreign Application Priority Data

Dec. 11, 2020  (TW) ................................. 109143897

(51) Int. Cl.
*G06T 7/80* (2017.01)
*G06T 7/215* (2017.01)
*G06V 10/25* (2022.01)
*G06V 20/52* (2022.01)

(52) U.S. Cl.
CPC ............... *G06T 7/80* (2017.01); *G06T 7/215* (2017.01); *G06V 10/25* (2022.01); *G06V 20/52* (2022.01); *G06T 2207/30232* (2013.01)

(58) Field of Classification Search
None
See application file for complete search history.

(56) References Cited

U.S. PATENT DOCUMENTS

| | | | |
|---|---|---|---|
| 9,940,535 B1* | 4/2018 | Obotnine | B25J 9/1697 |
| 2010/0134634 A1* | 6/2010 | Witt | H04N 5/2224 348/181 |
| 2015/0254861 A1* | 9/2015 | Chornenky | H04M 1/0264 348/135 |
| 2022/0189064 A1* | 6/2022 | Huang | G06V 20/52 |
| 2023/0401274 A1* | 12/2023 | Denninghoff | G06Q 30/0251 |

FOREIGN PATENT DOCUMENTS

TW  201140502 A1  11/2011

* cited by examiner

*Primary Examiner* — Tahmina N Ansari
(74) *Attorney, Agent, or Firm* — Winston Hsu

(57) ABSTRACT

A camera angle detection method is applied to a surveillance apparatus and includes detecting a plurality of straight lines within a surveillance image acquired by the surveillance apparatus, selecting at least one first candidate parallel line and at least one second candidate parallel line from the plurality of straight lines according to a directional trend, stretching the first candidate parallel line and the second candidate parallel line to acquire an intersection point, and computing parameter difference between the intersection point and a reference point of the surveillance image so as to transform the parameter difference to acquire a tilted angle of an optical axis of a lens of the surveillance apparatus relative to a supporting plane where the surveillance apparatus is located.

18 Claims, 10 Drawing Sheets

CAMERA ANGLE DETECTION METHOD AND RELATED SURVEILLANCE APPARATUS

BACKGROUND OF THE INVENTION

1. Field of the Invention

The present invention relates to a camera angle detection method and a related surveillance apparatus, and more particularly, to a camera angle detection method capable of automatically detecting an inclined angle and a related surveillance apparatus.

2. Description of the Prior Art

The surveillance apparatus can capture a surveillance image containing information of a related surveillance region, and acquire relative coordinates of the object in the surveillance region via analysis of the surveillance image; however, an actual installation angle and an actual installation height of the surveillance apparatus have to be acquired for computing the relative coordinates of the object in the surveillance region. In one conventional manner, the actual installation angle and the actual installation height are manually measured by an operator, which wastes labor power cost and results in inconvenient operation. In another conventional manner, a sensor, such as the gravity sensor and/or the proximity sensor, is especially disposed on the surveillance apparatus to detect the actual installation angle and the actual installation height, which increases hardware cost and selling price of the product, and is unbeneficial for market competition.

SUMMARY OF THE INVENTION

The present invention provides a camera angle detection method capable of automatically detecting an inclined angle and a related surveillance apparatus for solving above drawbacks.

According to the claimed invention, a surveillance apparatus and a camera angle detection method applied to the surveillance apparatus are disclosed. The surveillance apparatus includes an image receiver and an operation processor. The image receiver is adapted to acquire a surveillance image. The operation processor is electrically connected to the image receiver in a wire manner or in a wireless manner. The operation processor is adapted to detect a plurality of straight lines within the surveillance image, select at least one first candidate parallel line and at least one second candidate parallel line from the plurality of straight lines according to a directional trend, stretch the first candidate parallel line and the second candidate parallel line to acquire an intersection point, and compute parameter difference between the intersection point and a reference point of the surveillance image and transform the parameter difference for acquiring an inclined angle of an optical axis of a lens of the surveillance apparatus relative to a supporting plane whereon the surveillance apparatus is located.

The camera angle detection method and the surveillance apparatus of the present invention can detect the plurality of straight lines within the surveillance image, and search the candidate parallel lines from the plurality of straight lines, so as to acquire the intersection point and/or the disappearing point. The present invention provides several manners of acquiring the candidate parallel lines. The first embodiment can detect and set the straight lines provided by a shape or the appearance of the static object within the surveillance image as the candidate parallel lines. The second embodiment and the third embodiment can detect and set the straight lines provided by the moving trace of the same moving object within the surveillance image as the candidate parallel line. The fourth embodiment can detect and set the straight lines provided by body features of different moving objects within the surveillance image as the candidate parallel line. The horizontal line and the vertical line can be optionally excluded from the plurality of straight lines in accordance with the actual demand. The plurality of straight lines can be optionally divided into several groups in accordance with the slope of each straight line. The plural candidate parallel lines can be extracted from one or several converged straight line groups. The candidate parallel lines can be intersected to provide the disappearing point, and the parameter difference between the disappearing point and the reference point of the surveillance image can be analyzed to compute the camera inclined angle of the surveillance apparatus. Comparing to the prior art, the present invention can rapidly acquire and calibrate the camera angle and the installation height of the surveillance apparatus via software computation, without extra labor power and hardware cost, and can increase product competition in the consumer market.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
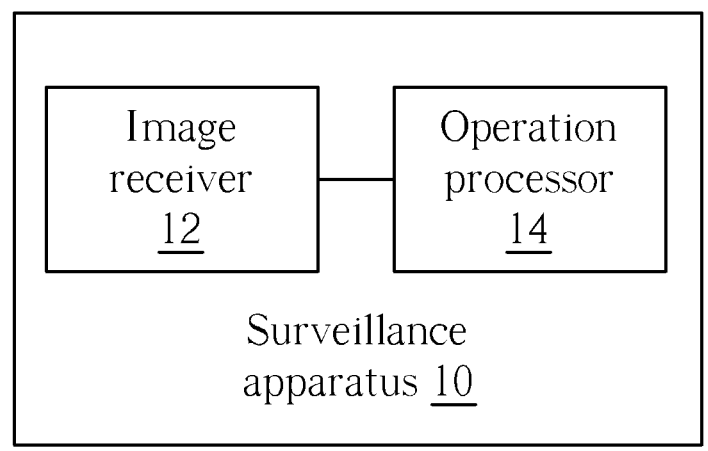
FIG. 1 is a functional block diagram of a surveillance apparatus according to an embodiment of the present invention.
Figure 2:
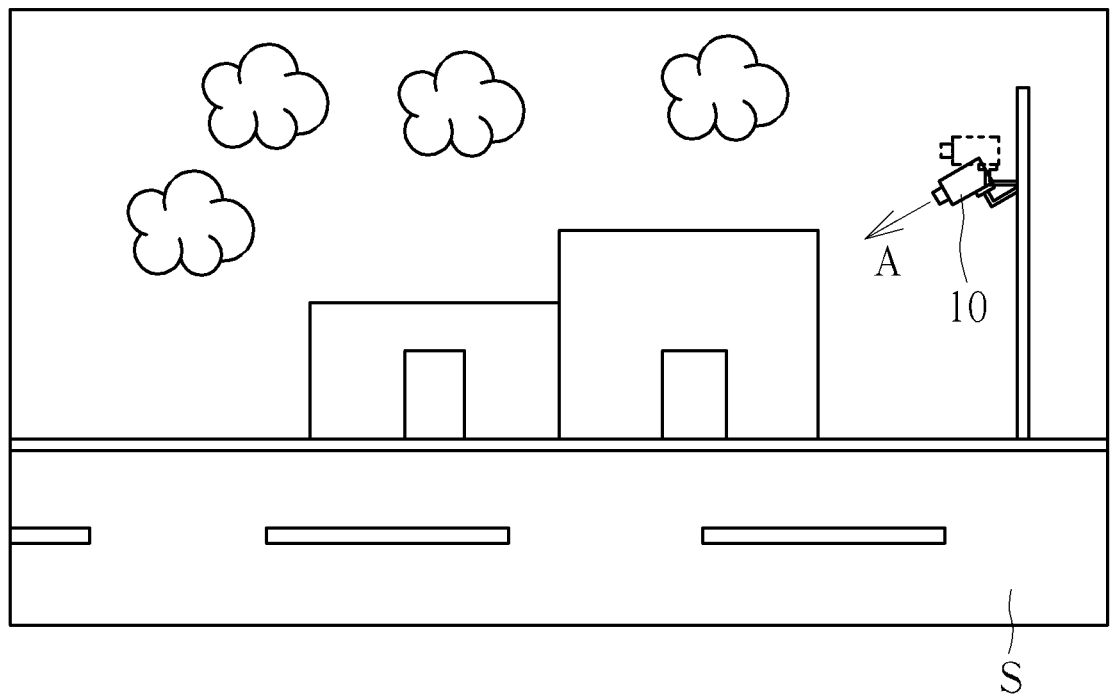
FIG. 2 is diagram of the surveillance apparatus according to the embodiment of the present invention.
Figure 3:
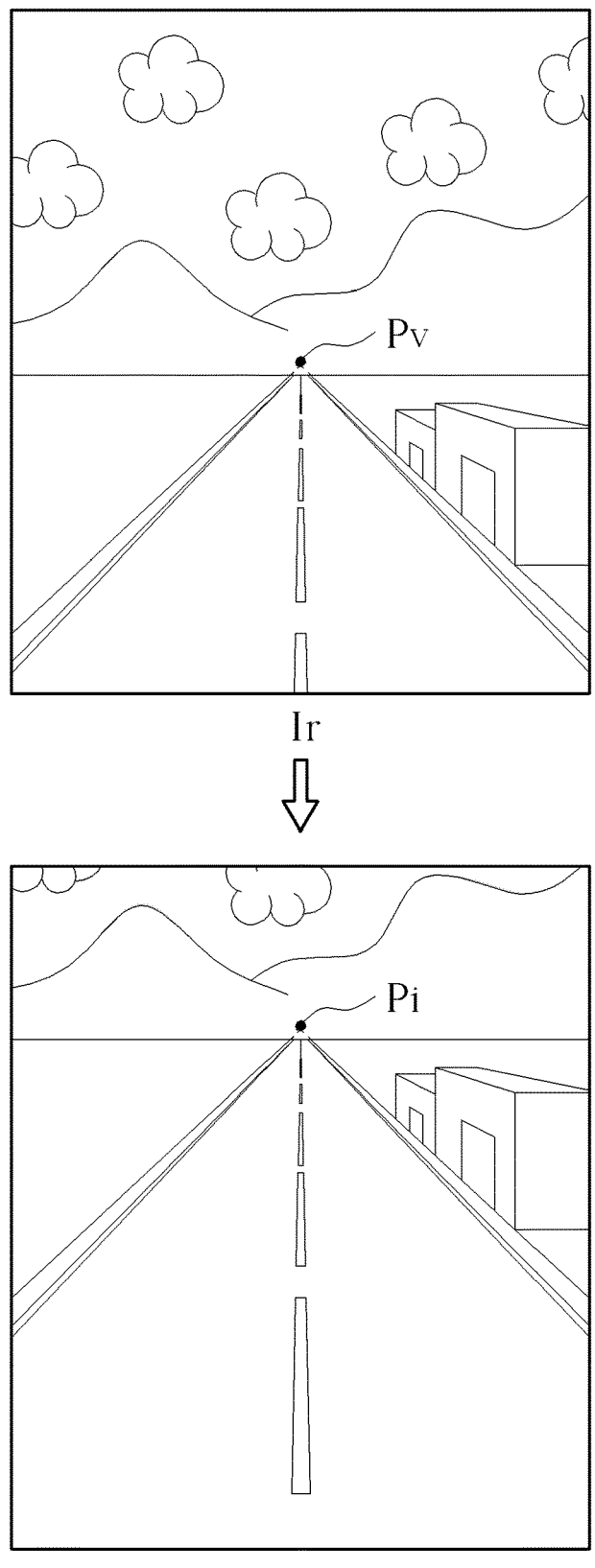
FIG. 3 is a diagram of a surveillance image captured by the surveillance apparatus according to the embodiment of the present invention.

Please refer to FIG. 1 to FIG. 3. FIG. 1 is a functional block diagram of a surveillance apparatus 10 according to an embodiment of the present invention. FIG. 2 is diagram of the surveillance apparatus 10 according to the embodiment of the present invention. FIG. 3 is a diagram of a surveillance image I captured by the surveillance apparatus 10 according to the embodiment of the present invention. The surveillance apparatus 10 can include an image receiver 12 and an operation processor 14. The image receiver 12 can be a camera used to face a surveillance region and directly capture the surveillance image I; further, the image receiver 12 can be a data receiver used to receive the surveillance image I captured by an external camera in a wire manner or in a wireless manner. The operation processor 14 can be a central processing unit of the computer system, or a graphic processing unit of the camera, or any units with a data processing function. The operation processor 14 can be electrically connected to the image receiver 12 in the wire manner or in the wireless manner. The operation processor 14 can analyze the surveillance image I to determine a camera angle of the surveillance apparatus 10 for adjustment.

If an optical axis of a lens of the surveillance apparatus 10 is perpendicular to a normal planar vector of the ground, such as a dotted pattern shown in FIG. 2, a disappearing point Pv (which means an intersection point) intersected by any two stretched parallel lines within the surveillance image I acquired by the surveillance apparatus 10 can be located at a center of a vertical line in the surveillance image I, and a horizontal line where the disappearing point Pv is intersected with can be the horizon in the surveillance image I, as a reference image Ir shown in FIG. 3. In a possible situation, the surveillance apparatus 10 may be inclined downwardly, such as a solid pattern shown in FIG. 2, so that the surveillance region can cover all areas around the surveillance apparatus 10; for example, an object located under the surveillance apparatus 10 can be captured. In the meantime, an intersection point Pi intersected by any two stretched parallel lines within the surveillance image I can be deviated from the center of the surveillance image I, as shown in FIG. 3. The surveillance apparatus 10 can execute a camera angle detection method of the present invention to estimate the camera angle of the surveillance apparatus 10 for calibrating an installation height of the surveillance apparatus 10, without actual measurement of the camera angle or the installation height.

Figure 4:
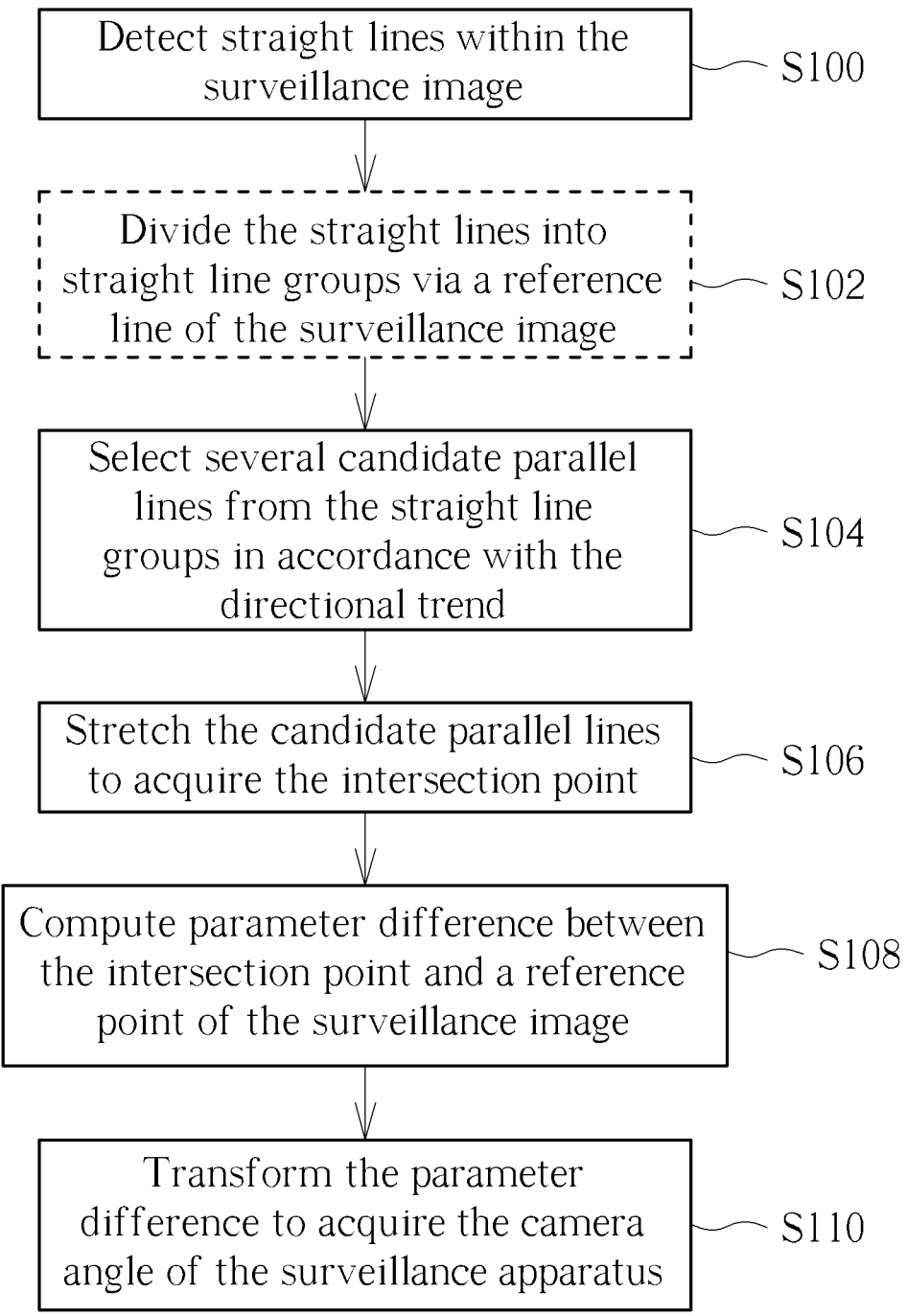
FIG. 4 is a flow chart of the camera angle detection method according to the embodiment of the present invention.
Figure 5:
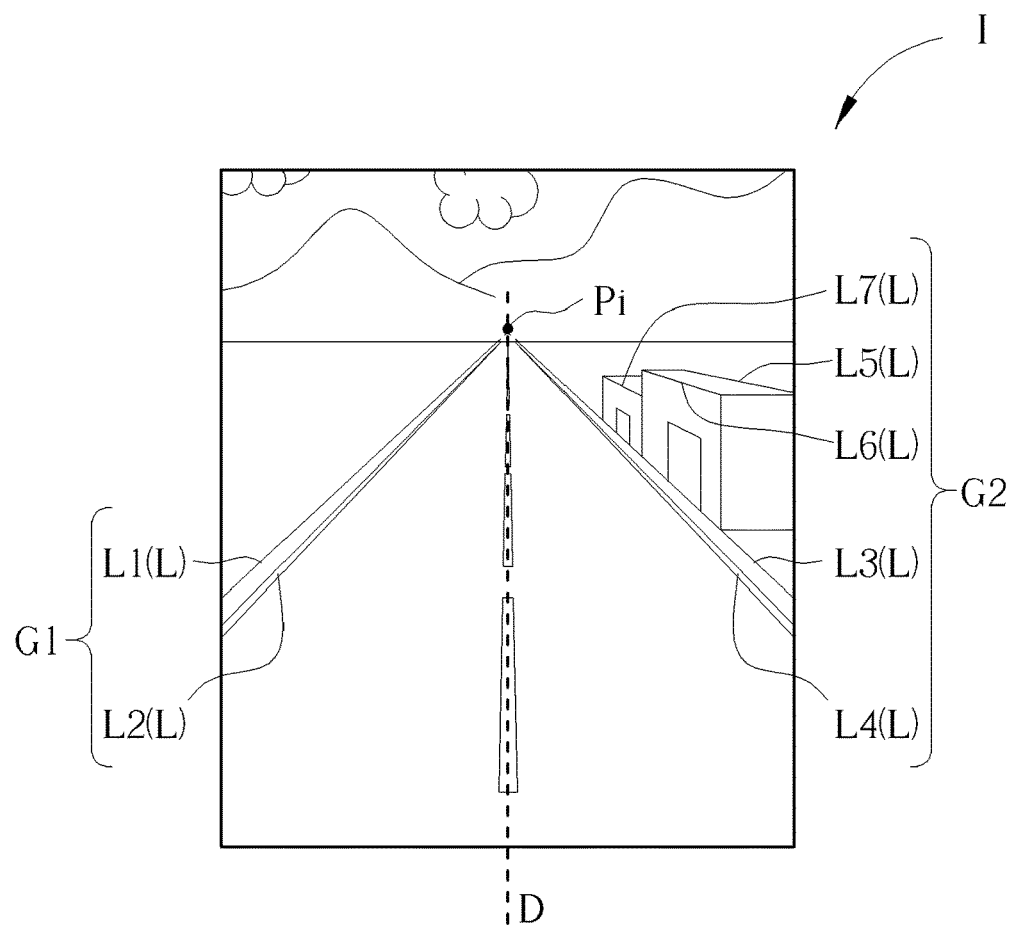
FIG. 5 is a diagram of the surveillance image applied for the camera angle detection method according to a first embodiment of the present invention.

Please refer to FIG. 4 and FIG. 5. FIG. 4 is a flow chart of the camera angle detection method according to the embodiment of the present invention. FIG. 5 is a diagram of the surveillance image I applied for the camera angle detection method according to a first embodiment of the present invention. First, step S100 can be executed to detect a plurality of straight lines L within the surveillance image I. In the first embodiment shown in FIG. 5, the straight line L may be a boundary line L1 between the road and the left grassland, or a marking line L2 on the left side of the road, or a boundary line L3 between the road and the right grassland, or a marking line L4 on the right side of the road, or outer edges L5, L6 and L7 of the building on the right side of the road. The straight line L can optionally be some horizontal lines or some vertical lines within the surveillance image I; however, the present invention may exclude the substantially horizontal and vertical lines, and a detailed description of exclusion is interpreted in the following. The straight line L can be the continuous straight line or the discontinuous straight line. For example, the boundary line L1 and the marking line L2 can be the continuous straight lines L, and a fence or a handrail on the road can be the discontinuous straight lines L.

Then, steps S102 and S104 can be executed to divide the plurality of straight lines L into two or more than two straight line groups via a reference line D of the surveillance image I, and at least select a first candidate parallel line and a second candidate parallel line from one or some of the straight line groups in accordance with a directional trend. The straight lines L in each straight line group may have greater opportunity for matching with candidate parallel lines. The reference line D can be a central boundary line used to divide the surveillance image I into two equal areas, or a boundary line used to divide the surveillance image I into several unequal areas in a specific rule; application of the reference line D can depend on an actual demand. A number of the straight line group can be varied in accordance with a property of the reference line D. For example, two straight line groups are generated if one reference line D is set in the surveillance image I, and three straight line groups are generated if two reference lines D are set in the surveillance image I. In addition, step S102 can be an optional process; the present invention can select the first candidate parallel line and the second candidate parallel line from the plurality of straight lines L in accordance with the directional trend without dividing the plurality of straight lines L into several groups.

In the first embodiment, the reference line D is the central boundary line of the surveillance image I, and the plurality of straight lines L can be divided into a first straight line group G1 in a left side and a second straight line group G2 in a right side. The first straight line group G1 can include the boundary line L1 and the marking line L2. The second straight line group G2 can include the boundary line L3, the marking line L4 and the outer edges L5~L7. The directional trend in step S104 can be interpreted as a slope trend of the straight lines, which means the camera angle detection method of the present invention can compute slope of each of the plurality of straight lines L, and some straight lines L that have a slope difference conforming to a slope threshold range can be set as a candidate parallel line assembly; the straight lines L that have the same or similar slope can be classified into one candidate parallel line assembly. If the slope difference does not conform to the slope threshold range, the camera angle detection method may exclude the straight lines which are the substantially horizontal line and the substantially vertical line from the plurality of straight lines L, so as to decrease computation quantity and increase computation accuracy.

For example, if the slope difference between the boundary line L1 and the marking line L2 of the first straight line group G1 conforms to the slope threshold range, the boundary line L1 and the marking line L2 can be classified into the same candidate parallel line assembly, and the boundary line L1 and the marking line L2 may be selected as the first candidate parallel line and the second candidate parallel line. In addition, the slope difference between the boundary line L3 and the marking line L4 of the second straight line group G2 conforms to the slope threshold range, so that the boundary line L3 and the marking line L4 can be classified into the same candidate parallel line assembly. The slopes of the outer edges L5~L7 are different from the slopes of the boundary line L3 and the marking line L4, but the slope difference between the outer edges L5~L7 and the boundary line L3 and the marking line L4 conforms to the slope threshold range, so that the outer edges L5~L7 and the boundary line L3 and the marking line L4 can be classified into the same candidate parallel line assembly, or the outer edges L5~L7 can be classified into another candidate parallel line assembly different from ones of the boundary line L3 and the marking line L4. Therefore, the present invention can select the boundary line L3 and the marking line L4 respectively as the first candidate parallel line and the second candidate parallel line, or define the first candidate parallel line and the second candidate parallel line from the outer edges L5~L7, or define more than two candidate parallel lines from the boundary line L3, the marking line L4 and the outer edge L5~L7.

Then, step S106 can be executed to virtually stretch the first candidate parallel line and the second candidate parallel line to acquire the intersection point Pi. If the candidate parallel line assembly only has two candidate parallel lines, such as the boundary line L1 and the marking line L2, one intersection point Pi can be acquired; if the candidate parallel line assembly has more than two candidate parallel lines, such as the boundary line L3, the marking line L4 and the outer edges L5~L7, a plurality of intersection points Pi can be acquired. The intersection point Pi may be located inside the surveillance image I, or outside the surveillance image I due to stretch of the candidate parallel lines. Position of the intersection point Pi can depend on the camera angle of the surveillance apparatus 10, and is not limited to the situation in the first embodiment.

Then, steps S108 and S110 can be executed to compute parameter difference between the intersection point Pi and a reference point of the surveillance image I, and transform the parameter difference to acquire the camera angle of the surveillance apparatus 10. The plurality of intersection points can provide a plurality of camera angles, and a mode number of the camera angles can be set as the final camera angle; the mode number that used to decide the final camera angle may be determined via a predefined threshold. In step S108, the reference point can be a center of the surveillance image I, or the disappearing point Pv of the reference image Ir shown in FIG. 3. The parameter difference can be difference of a distance, an angle or other feathers between the intersection point Pi and the disappearing point Pv. For example, the parameter difference between the reference point and the mode number of angles derived from several intersection points Pi can be computed when several candidate parallel line of the candidate parallel line assembly are intersected to generate the foresaid intersection points Pi. The present invention may utilize the Euler angles algorithm or other mathematic models to transform the parameter difference into the camera angle of the surveillance apparatus 10. Actual computation of foresaid transformation can depend on adjustable angles and an angle sequence of the surveillance apparatus 10, such as a pan angle, a tilt angle and/or a roll angle of the surveillance apparatus 10.

Figure 6:
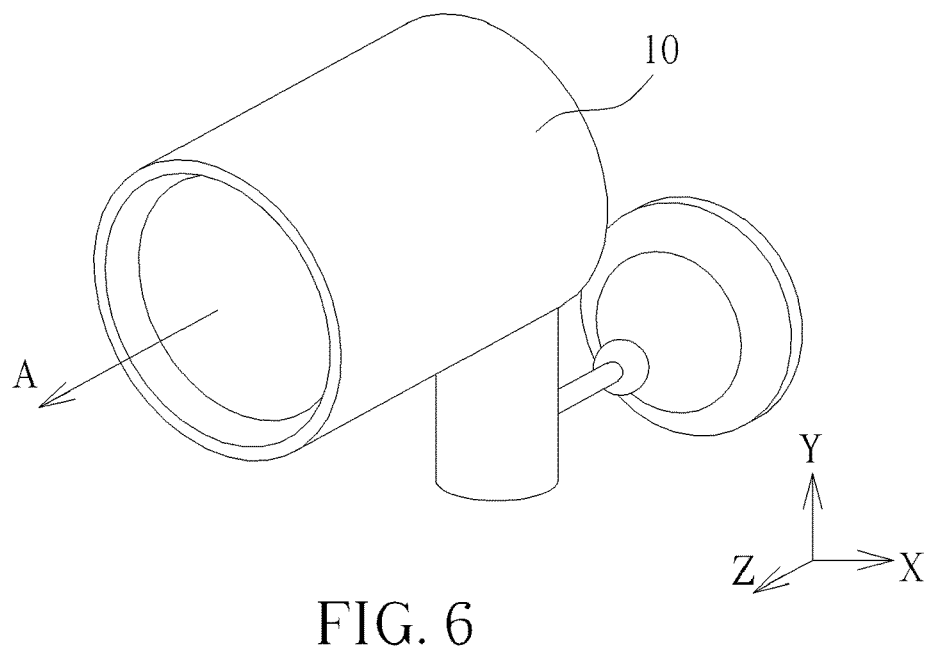
FIG. 6 is an appearance diagram of the surveillance apparatus according to the embodiment of the present invention.

Please refer to FIG. 2, FIG. 3 and FIG. 6. FIG. 6 is an appearance diagram of the surveillance apparatus 10 according to the embodiment of the present invention. The surveillance apparatus 10 can be rotated along X-axis to adjust the tilt angle, and further can be rotated along Y-axis to adjust the pan angle, and further can be rotated along Z-axis to adjust the roll angle. An inclined angle of the optical axis A of a lens of the surveillance apparatus 10 relative to a supporting plane S whereon the surveillance apparatus 10 is located can be interpreted as the tilted angle. In a possible situation, the pan angle and the roll angle of the surveillance apparatus 10 are invariable and in a standard mode; meanwhile, the intersection point Pi can be directly located above the reference point (which means the disappearing point Pv), and the camera angle detection method of the present invention can analyze depth of field of the surveillance image I, and/or the parameter difference between the intersection point Pi and the reference point to acquire the inclined angle of the surveillance apparatus 10 relative to the supporting plane S, such as an angle difference in the optical axis A between the dotted pattern and the solid pattern shown in FIG. 2.

In other possible situations, the pan angle and the roll angle of the surveillance apparatus 10 may not be set in the standard mode, and one or two of the pan angle and the roll angle can be computed in other manners, and then the Euler angles algorithm can be applied for acquiring the parameter difference between the intersection point Pi and the reference point of the surveillance image I, so as to compute the tilt angle of the surveillance apparatus 10 via foresaid transformation.

The Euler angles algorithm describes coordinate orientation of a solid object in a three dimensional space. The coordinate orientation of the solid object can be set by rotation of three Euler angles in a specific sequence, which means the coordinate orientation can be decided via three basic rotation matrixes. The surveillance apparatus 10 of the present invention can be adjusted in a sequence of the pan angle, the tilt angle and the roll angle, which is matched with the Euler matrix in Formula 1. The angle α is defined as the pan angle, and the angle β is defined as the tilt angle, and the angle γ is defined as the roll angle. If the surveillance apparatus 10 is adjusted in other angle sequences, or applied by other mathematic models (which results in difference sequences of the pan angle, the tilt angle and the roll angle), the surveillance apparatus 10 is matched with other Euler matrix, and a detailed description is omitted herein for simplicity. The camera angle detection method of the present invention can compute element values of the rotation matrix via analytical expression of the rotation matrix and an inverse trigonometric function, such as acquiring the element value of "$-S_2$", and the angle β can be equal to a result of arc $(\sin(S_2))$ $$Y_\alpha X_\beta Z_\gamma = \begin{bmatrix} \cos\alpha & 0 & \sin\alpha \\ 0 & 1 & 0 \\ -\sin\alpha & 0 & \cos\alpha \end{bmatrix} \begin{bmatrix} 1 & 0 & 0 \\ 0 & \cos\beta & -\sin\beta \\ 0 & \sin\beta & \cos\beta \end{bmatrix} \quad \text{Formula 1}$$

$$\begin{bmatrix} \cos\gamma & -\sin\gamma & 0 \\ \sin\gamma & \cos\gamma & 0 \\ 0 & 0 & 1 \end{bmatrix} = \begin{bmatrix} c_1 & 0 & s_1 \\ 0 & 1 & 0 \\ -s_1 & 0 & c_1 \end{bmatrix} \begin{bmatrix} 1 & 0 & 0 \\ 0 & c_2 & -s_2 \\ 0 & s_2 & c_2 \end{bmatrix}$$

$$\begin{bmatrix} c_3 & -s_3 & 0 \\ s_3 & c_3 & 0 \\ 0 & 0 & 1 \end{bmatrix} = \begin{bmatrix} c_1c_3 + s_1s_2s_3 & c_3s_1s_2 - c_1s_3 & c_2s_1 \\ c_2s_3 & c_2c_3 & -s_2 \\ c_3s_2s_3 - s_1c_3 & s_1s_3 + c_1c_3s_2 & c_1c_2 \end{bmatrix}$$

If the camera angle detection method finds out one intersection point, Formula 2 can be used to compute the rotation matrix; if the intersection point is the intersection point along Z-axis shown in FIG. 6, Formula 2 can be used to acquire a third row r3 (including the element values of $c_2s_1$, $-s_2$ and $c_1c_2$) of the Euler matrix in Formula 1. The parameter K is a camera parameter matrix, referring to Formula 3. The parameters x and y are coordinates of the intersection point in the surveillance image. The data (cx, cy) are central coordinates of the surveillance image I. The data (fx, fy) are defined as a focal distance of the surveillance apparatus 10 in image pixels.

$$K^{-1} * p(x, y, 1)^T = r3 \quad \text{Formula 2}$$

$$K = \begin{bmatrix} fx & 0 & cx \\ 0 & fy & cy \\ 0 & 0 & 1 \end{bmatrix} \qquad \text{Formula 3}$$

In the embodiment of the present invention, the roll angle can be analyzed and calibrated via convolutional neutral network (CNN). If the surveillance apparatus 10 includes a G-sensor (which is not shown in the figures), the surveillance apparatus 10 can be slightly rotated in accordance with the roll angle R currently detected by the G-sensor, and a slight rotation range as mentioned above can be set from two positive degrees to negative degrees. The surveillance apparatus 10 can detect whether a detection region conforms to a predefined condition (such as determining whether a specific human or a specific object is detected in the detection region) respectively in each angle of the rotation range, so as to compile a detection number of all angles of the rotation range; the foresaid number can represent several objects that conform to a threshold score, or represent several trace information of the detected objects. An angle value of the detection number conforming to a predefined condition (such as the largest number) can be interpreted as the correct roll angle R.

If the surveillance apparatus 10 does not have the G-sensor, an original point (which means the angle of zero degree) can be the base for setting the rotation range, and the above-mentioned method can be executed again to compute the correct roll angle R. It should be mentioned that even though the correct roll angle R is computed, the roll angle R still can be the base for setting another rotation range, and further compile the detection number of all angles of the another rotation range. If the roll angle R is correct, the detection number can be kept in a high level; if the surveillance apparatus 10 is moved due to an external force or specific factors, the corresponding roll angle R can be newly computed.

Figure 7:
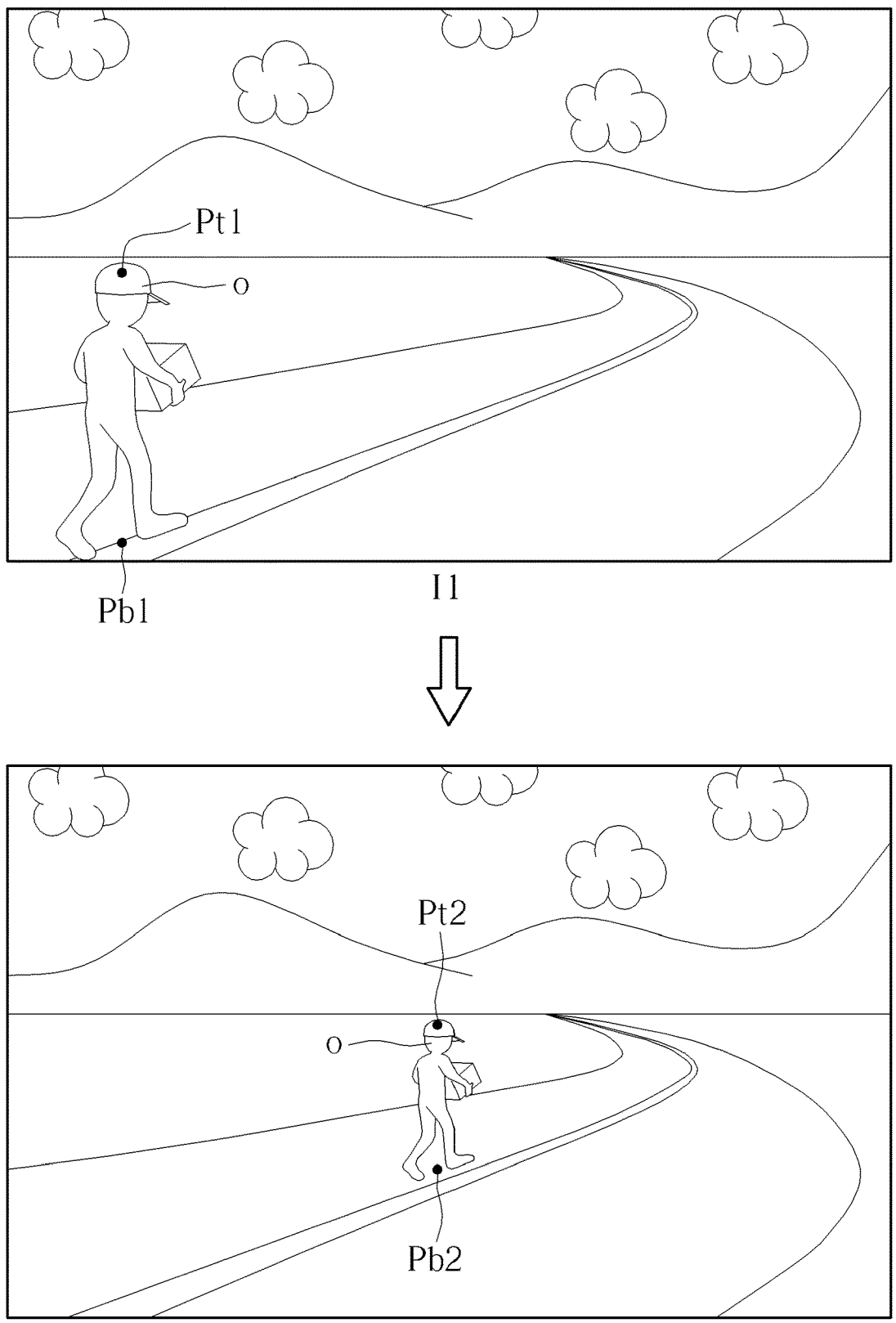
FIG. 7 is a diagram of the surveillance images acquired by the surveillance apparatus at different points of time according to a second embodiment of the present invention.
Figure 8:
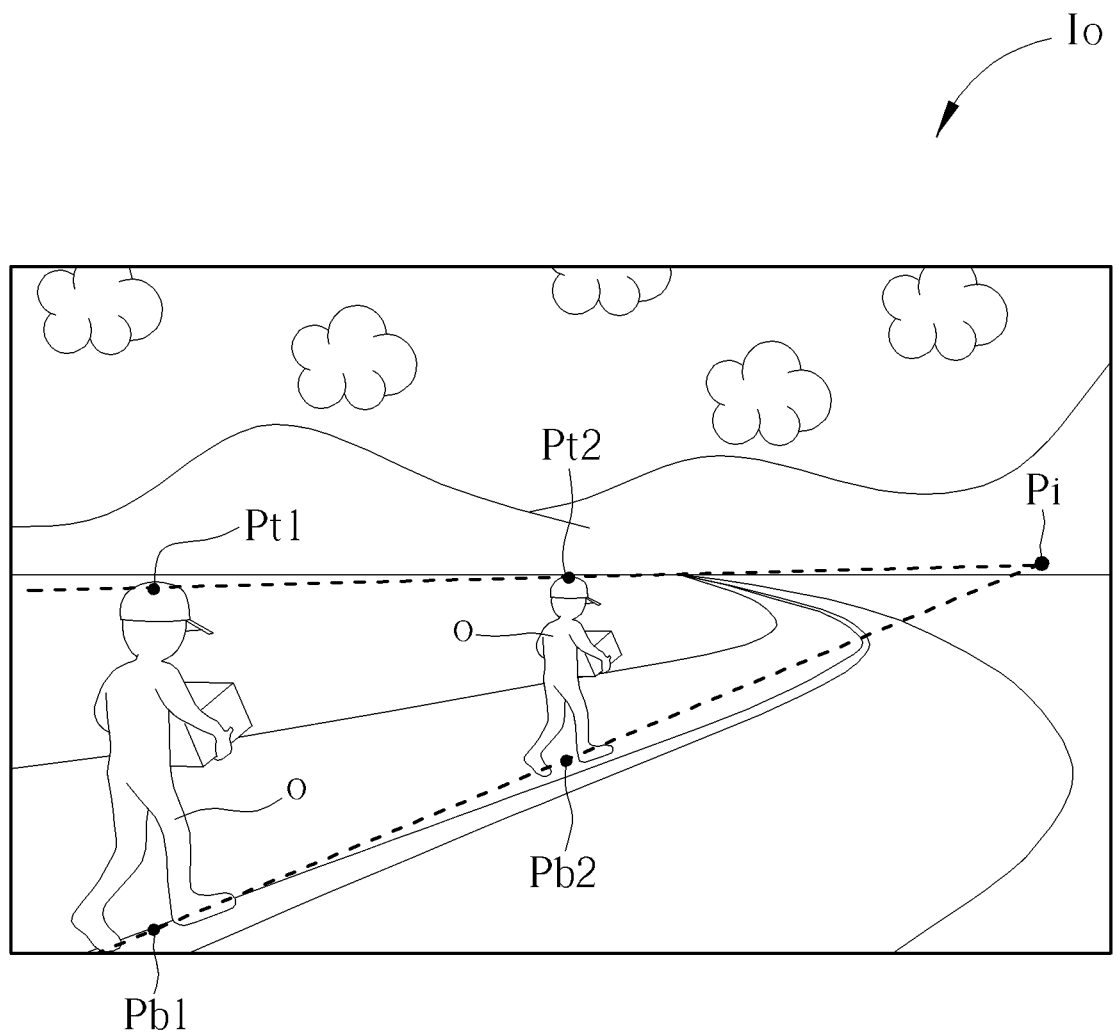
FIG. 8 is a diagram of an overlapped image formed by the surveillance images according to the second embodiment of the present invention.

Please refer to FIG. 7 and FIG. 8. FIG. 7 is a diagram of the surveillance images I1 and I2 acquired by the surveillance apparatus 10 at different points of time according to a second embodiment of the present invention. FIG. 8 is a diagram of an overlapped image Io formed by the surveillance images I1 and I2 according to the second embodiment of the present invention. In the second embodiment, step S100 of detecting the plurality of straight lines L can be changed to detect a moving object O within the surveillance image I for a start, and then acquire a first top reference point Pt1 and a first bottom reference point Pb1 of the moving object O at the first point of time (which means in the surveillance image I1), and further acquire a second top reference point Pt2 and a second bottom reference point Pb2 of the moving object O at the second point of time (which means in the surveillance image I2). A connection (which is drawn as a dotted line) between the first top reference point Pt1 and the second top reference point Pt2, and a connection (which is drawn as the dotted line) between the first bottom reference point Pb1 and the second bottom reference point Pb2 can be respectively set as the first candidate parallel line and the second candidate parallel line in step S104, as shown in FIG. 8.

The moving object O can be a passenger or a vehicle. The top and the bottom of the moving object O can respectively be the head and the foot of the passenger, or the roof and the tire of the vehicle. The camera angle detection method of the present invention can utilize image identification technique to determine position of the top reference points Pt1 and Pt2 and the bottom reference points Pb1 and Pb2 of the moving object O; for example, the present invention may identify contours of the head and the foot, and compute gravity centers of the foresaid contours to set as the reference point. Actual application of the reference point is not limited to the above-mentioned embodiment, and a detailed description is omitted herein for simplicity. The present invention can further utilize the convolutional neutral network (CNN) to detect the actual top and the actual bottom of the moving object O, so as to accurately determine the candidate parallel line and an object height.

Then, step S106 can be executed to generate the disappearing point by virtually stretching and intersecting the first candidate parallel line (which means the connection between the top reference points) and the second candidate parallel line (which means the connection between the bottom reference points); the disappearing point may be located on the distant horizon in the overlapped image Io. Then, steps S108 and S110 can be executed to acquire the camera angle of the surveillance apparatus 10. Computation of the intersection point and the camera angle is similar to computation of the first embodiment, and a detailed description is omitted herein for simplicity. If the moving object O is the passenger, the camera angle detection method of the present invention can further determine whether an appearance difference between a first appearance of the moving object O at the first point of time and a second appearance of the moving object O at the second point of time conforms to a deformation threshold range. The appearance difference may be interpreted as a feet gesture of the passenger, or the passenger facing the surveillance apparatus 10 in a front side or a back side or a lateral side, or other features that result in variation of the body height. The deformation threshold range can be used to define whether the first appearance and the second appearance have the same or similar gesture. The deformation threshold range can be acquired by automatic statistics of the surveillance apparatus 10, or be manually set in accordance with the actual demand.

For example, the passenger may sway the feet in walking, and a height of the gesture having the right foot swayed to the front and the left foot swayed to the rear can be different from a height of the gesture having the right foot swayed to the rear and the left foot swayed to the front. Therefore, when the camera angle detection method of the present invention determines the moving object O belongs to the passenger, the camera angle detection method can define that a time interval between the first point of time and the second point of time is equal to time difference in even numbers of passenger's step, so as to ensure the first appearance and the second appearance can have the same or similar gesture. It should be mentioned that the time difference in even numbers of the passenger's step can keep gesture unity of the passenger, such as the gesture having the right foot swayed to the front and the left foot swayed to the rear shown in FIG. 7. If the moving object O belongs to the vehicle, the time interval between the first point of time and the second point of time can be adjusted in response to the vehicle moved in a straight line or turned a corner. Accordingly, the moving direction of the moving object O (such as the passenger walking in the straight line or turning the corner) can be used to decide the time interval between the first point of time and the second point of time when the moving object O belongs to the passenger, and related variation can depend on the actual demand.

Figure 9:
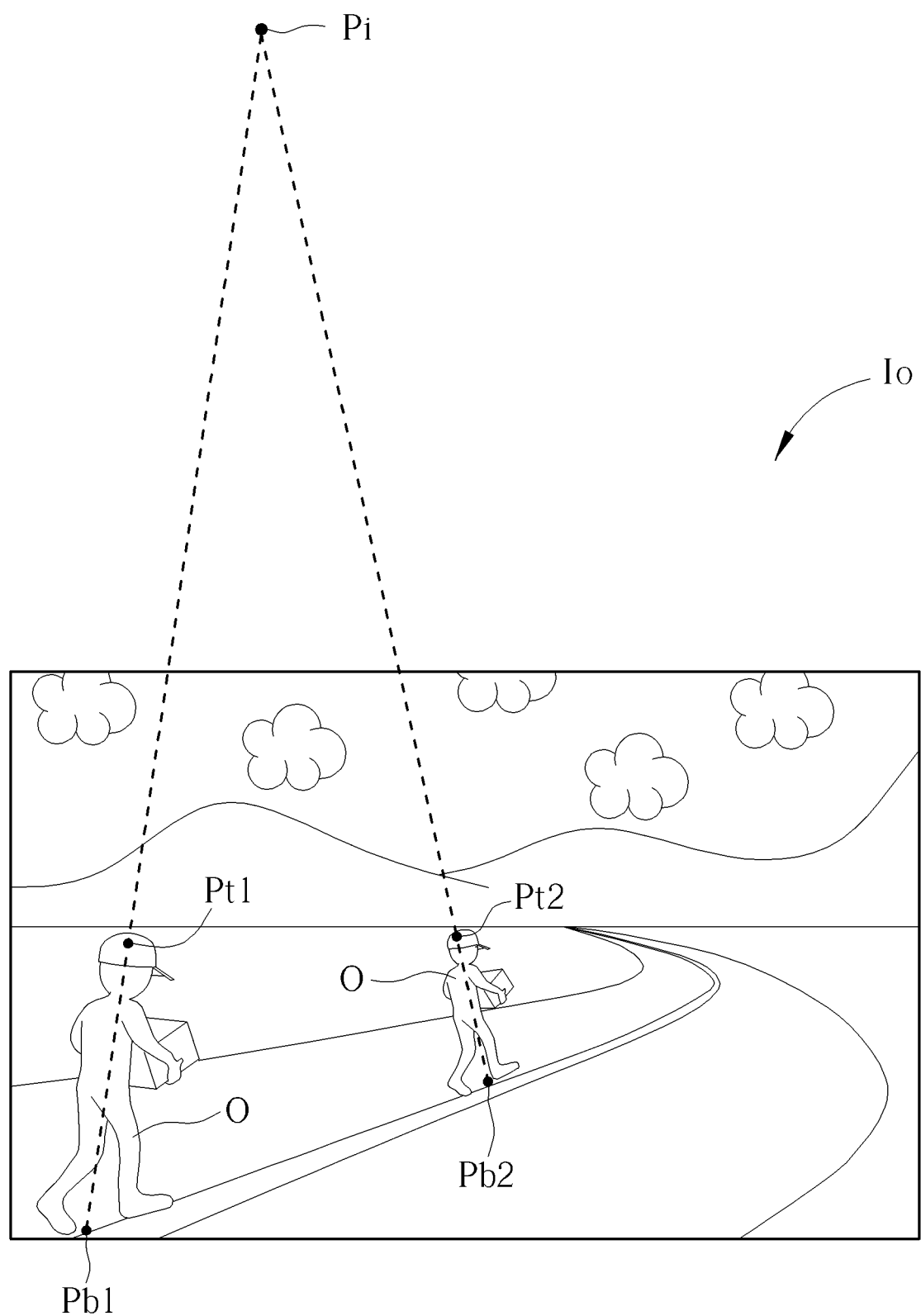
FIG. 9 is a diagram of the overlapped image according to a third embodiment of the present invention.

Please refer to FIG. 7 and FIG. 9. FIG. 9 is a diagram of the overlapped image Io according to a third embodiment of the present invention. In the third embodiment, the overlapped image Io can set the connection (which is marked as a dotted line) between the first top reference point Pt1 and the first bottom reference point Pb1 and the connection (which is marked as a dotted line) between the second top reference point Pt2 and the second bottom reference point Pb2 respectively as the first candidate parallel line and the second candidate parallel line in step S104. When the two candidate parallel lines are acquired, the camera angle detection method of the present invention can execute steps S106, S108 and S110 to find out the intersection point of the candidate parallel lines and the camera angle of the surveillance apparatus 10, and a detailed description is omitted herein for simplicity.

Figure 10:
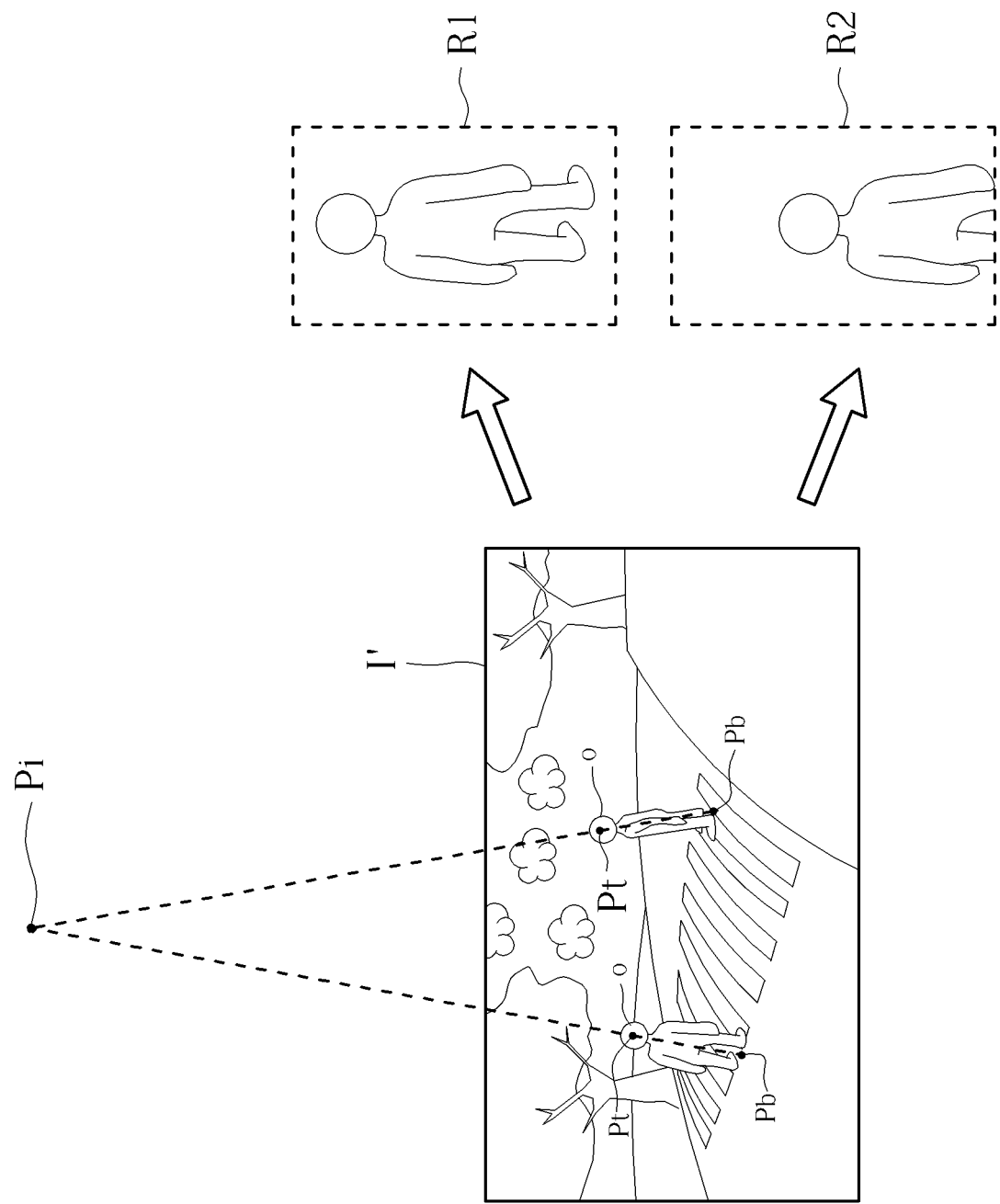
FIG. 10 is a diagram of the surveillance image according to a fourth embodiment of the present invention.
Figure 11:
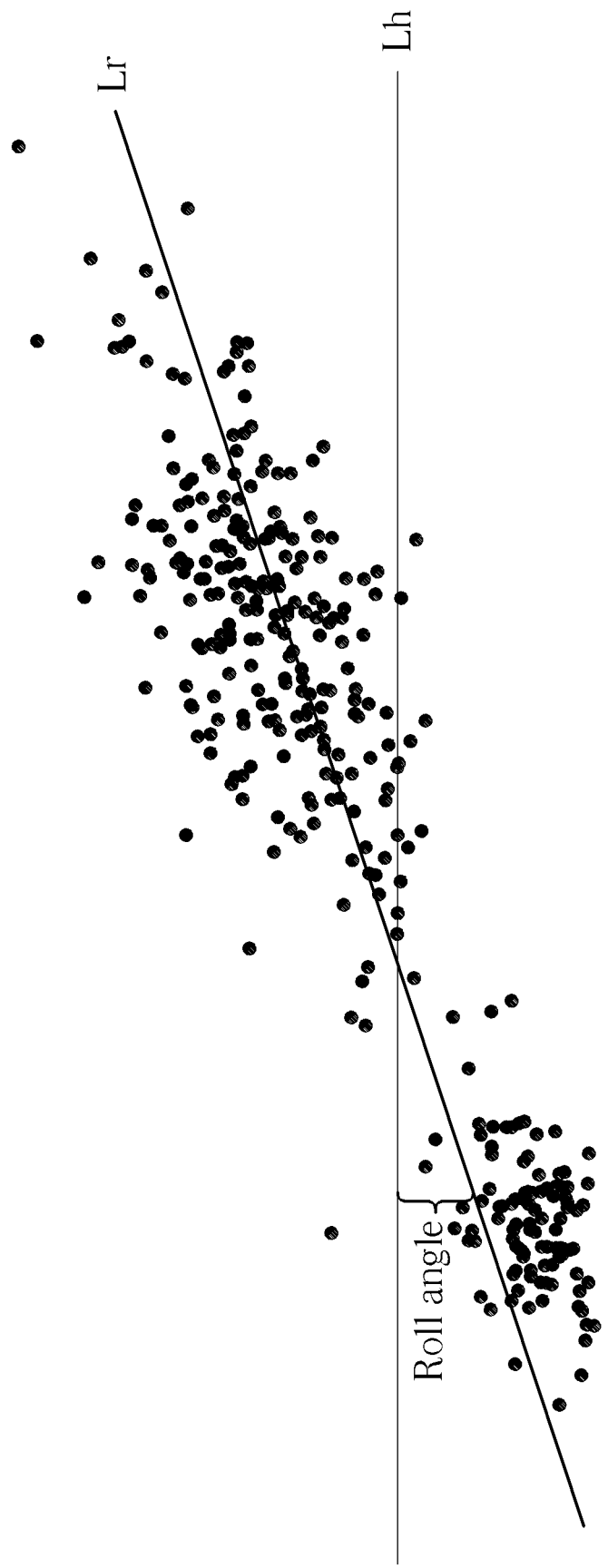
FIG. 11 and FIG. 12 are diagrams of regression analysis of the intersection points according to the second embodiment of the present invention.
Figure 12:
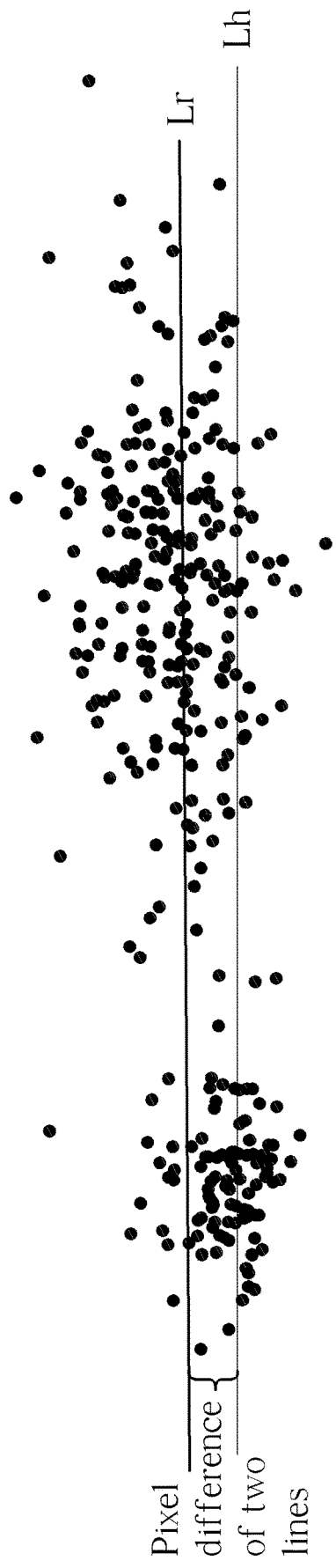

The second embodiment shown in FIG. 8 and the third embodiment shown in FIG. 9 can utilize one moving object O to acquire the plurality of candidate parallel lines, and a plurality of moving object can be applicable in accordance with the actual demand. Please refer to FIG. 10. FIG. 10 is a diagram of the surveillance image I' according to a fourth embodiment of the present invention. Please refer to FIG. 11 and FIG. 12 are diagrams of regression analysis of the intersection points according to the second embodiment of the present invention. In this embodiment, step S10 of detecting the plurality of straight lines L can be applied for detecting two or more than two moving objects O within the surveillance image I', and searching the top reference points Pt and the bottom reference points Pb of each of the moving objects O. Then, the connection between the top reference point Pt and the related bottom reference point Pb of each moving object O can be formed to set as the candidate parallel line in step S104. As the plurality of candidate parallel lines is acquired, the camera angle detection method of the present invention can execute steps S106, S108 and S110 to find out the intersection point of the candidate parallel lines and the camera angle of the surveillance apparatus 10, and a detailed description is omitted herein for simplicity. It should be mentioned that a plurality of intersection points Pi can be generated in response to the plurality of moving objects O, and distribution of the plurality of intersection points Pi can be results shown in FIG. 11 and FIG. 12. The present invention can utilize the plurality of intersection points Pi to compute linear regression Lr for acquiring the roll angle and the tilt angle, and a line Lh shown in FIG. 11 and FIG. 12 can be the horizontal line of a projection point resulted from the lens center. The arctangent of (difference Y/fy) is the tilt angle, as shown in Formula 4, a value "fy" can be acquired by Formula 3, and dy(difference Y) is the pixel difference of two lines in FIG. 12.

$$\text{Tilt angle} = \arctan(dy/fy) \quad \text{Formula 4}$$

In the fourth embodiment shown in FIG. 10, the camera angle detection method of the present invention can utilize motion detection technique to detect the moving object O within the surveillance image I'. The motion detection technique may mark an identification frame R1 in an entire region of interest upon the moving object O, which means the identification frame R1 can cover the whole passenger; further, the motion detection technique may mark the identification frame R2 on a partial region of interest upon the moving object O, and the therefore the identification frame R2 can cover an upper part and a few lower part of the passenger. Then, the camera angle detection method can search middle points respectively on an upper side and a lower side of the identification frame R1 or R2, and set the middle points respectively as the top reference point Pt and the bottom reference point Pb of the moving object O; the connection between the middle points respectively on the upper side and the lower side can be the candidate parallel line in step S104. Therefore, the fourth embodiment can utilize the motion detection technique to mark the identification frame R1 or R2 on the entire or some part of the region of interest upon the moving object O, and set the connection between specific geometric points of the identification frame R1 or R2 as the candidate parallel line, without defining the top and the bottom of the moving object O via the image identification technique.

If the moving object O belongs to the passenger and the identification frame R1 is marked on the entire region of interest upon the moving object O, the camera angle detection method of the present invention can further analyze height error resulted from the gesture of the walking passenger; for example, feet position of the passenger cannot be accurately decided in response to one foot moved forward and the other foot moved backward, so that a center of the feet can be set as the bottom reference point Pb, or other geometric point between the feet can be set as the bottom reference point Pb. If the identification frame R2 is marked on the partial region of interest upon the moving object O, the identification frame R2 does not contain feet information, and the middle point on the lower side of the identification frame R2 can correspond to the bottom center of the moving object O, so that the middle point on the lower side of the identification frame R2 can be set as the bottom reference point Pb to reduce error resulted from the feet crossed gesture. Thus, the camera angle detection method of the present invention can decide whether to mark the identification frame R1 or R2 on the entire or partial region of interest upon the moving object O in accordance with the actual demand.

When the pan angle, the tilt angle and/or the roll angle of the surveillance apparatus are calibrated, the camera angle detection method can detect and analyze the height of the moving object within the surveillance image, and compare the object detected height with an object estimated height. The object estimated height can be a human mean height of the specific region whereon the surveillance apparatus is located, or a human statistic height analyzed by huge gathered data of the surveillance apparatus. The surveillance apparatus can acquire a possible installation height when being installed, and the possible installation height can be transformed into an actual installation height of the surveillance apparatus via a ratio of the object detected height to the object estimated height. Because the image captured by the surveillance apparatus may be deformed in edges unexpectedly, the present invention can preferably detect the height of the moving object within a specific range of the surveillance image, such as a central area on the image; when computing the object detected height and the object estimated height, the surveillance apparatus may further identify height difference resulted from the gender and/or the decoration of the object for acquiring accurate information.

In conclusion, the camera angle detection method and the surveillance apparatus of the present invention can detect the plurality of straight lines within the surveillance image, and search the candidate parallel lines from the plurality of straight lines, so as to acquire the intersection point and/or the disappearing point. The present invention provides several manners of acquiring the candidate parallel lines. The first embodiment can detect and set the straight lines provided by a shape or the appearance of the static object within the surveillance image as the candidate parallel lines. The second embodiment and the third embodiment can detect and set the straight lines provided by the moving trace of the same moving object within the surveillance image as the candidate parallel line. The fourth embodiment can detect and set the straight lines provided by body features of different moving objects within the surveillance image as the candidate parallel line. The horizontal line and the vertical line can be optionally excluded from the plurality of straight lines in accordance with the actual demand. The plurality of straight lines can be optionally divided into several groups in accordance with the slope of each straight line. The plural candidate parallel lines can be extracted from one or several converged straight line groups. The candidate parallel lines can be intersected to provide the disappearing point, and the parameter difference between the disappearing point and the reference point of the surveillance image can be analyzed to compute the camera inclined angle of the surveillance apparatus. Comparing to the prior art, the present invention can rapidly acquire and calibrate the camera angle and the installation height of the surveillance apparatus via software computation, without extra labor power and hardware cost, and can increase product competition in the consumer market.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A camera angle detection method is applied to a surveillance apparatus, the camera angle detection method comprising:
   detecting a plurality of straight lines within a surveillance image acquired by the surveillance apparatus;
   selecting at least one first candidate parallel line and at least one second candidate parallel line from the plurality of straight lines according to a directional trend, wherein the first candidate parallel line and at least one second candidate parallel line are two lines that are parallel in a real world but virtually intersected at a specific point inside the surveillance image;
   virtually extending the first candidate parallel line and the second candidate parallel line to be intersected at the specific point for setting as an intersection point; and
   computing parameter difference between the intersection point and a reference point of the surveillance image and transforming the parameter difference to acquire an inclined angle of an optical axis of a lens of the surveillance apparatus relative to a supporting plane whereon the surveillance apparatus is located.

2. The camera angle detection method of claim 1, further comprising:
   dividing the plurality of straight lines into a first straight line group and a second straight line group via a reference line of the surveillance image;
   wherein the first candidate parallel line and the second candidate parallel line are selected from at least one of the first straight line group and the second straight line group.

3. The camera angle detection method of claim 1, wherein selecting the first candidate parallel line and the second candidate parallel line from the plurality of straight lines according to the directional trend comprises:
   acquiring slopes of the plurality of straight lines;
   setting some of the plurality of straight lines that have a slope difference conforming to a slope threshold range as a candidate parallel line assembly; and
   selecting the first candidate parallel line and the second candidate parallel line from the candidate parallel line assembly.

4. The camera angle detection method of claim 3, further comprising:
   computing the parameter difference between the reference point and a mode number of angles derived from several intersection points when several candidate parallel line of the candidate parallel line assembly are intersected to generate the foresaid intersection points.

5. The camera angle detection method of claim 1, further comprising:
   detecting a moving object within the surveillance image;
   acquiring a first top reference point and a first bottom reference point of the moving object at a first point of time;
   acquiring a second top reference point and a second bottom reference point of the moving object at a second point of time different from the first point of time; and
   setting a connection between the first top reference point and the second top reference point as the first candidate parallel line, and setting a connection between the first bottom reference point and the second bottom reference point as the second candidate parallel line.

6. The camera angle detection method of claim 5, wherein an appearance difference between a first appearance and a second appearance of the moving object respectively acquired at the first point of time and the second point of time conforms to a deformation threshold range.

7. The camera angle detection method of claim 1, further comprising:
   detecting a moving object within the surveillance image;
   acquiring a first top reference point and a first bottom reference point of the moving object at a first point of time;
   acquiring a second top reference point and a second bottom reference point of the moving object at a second point of time different from the first point of time; and
   setting a connection between the first top reference point and the first bottom reference point as the first candidate parallel line, and setting a connection between the second top reference point and the second bottom reference point as the second candidate parallel line.

8. The camera angle detection method of claim 1, further comprising:
   detecting at least two moving objects within the surveillance image;
   acquiring a top reference point and a bottom reference point of each of the at least two moving objects; and
   setting one connection between the top reference point and the bottom reference point of one moving object and another connection between the top reference point and the bottom reference point of another moving object respectively as the first candidate parallel line and the second candidate parallel line.

9. The camera angle detection method of claim 8, wherein the at least two moving objects within the surveillance image are detected via motion detection technique, and an entire or a part of a region of interest upon each moving object is marked by an identification frame, and one middle point of an upper side and another middle point of a lower side of the identification frame are respectively set as the top reference point and the bottom reference point.

10. A surveillance apparatus, comprising:
    an image receiver adapted to acquire a surveillance image; and an operation processor electrically connected to the image receiver in a wire manner or in a wireless manner, the operation processor being adapted to detect a plurality of straight lines within the surveillance image, select at least one first candidate parallel line and at least one second candidate parallel line from the plurality of straight lines according to a directional trend, virtually extend the first candidate parallel line and the second candidate parallel line to be intersected at the specific point for setting as an intersection point, and compute parameter difference between the intersection point and a reference point of the surveillance image and transform the parameter difference for acquiring an inclined angle of an optical axis of a lens of the surveillance apparatus relative to a supporting plane whereon the surveillance apparatus is located;

wherein the first candidate parallel line and at least one second candidate parallel line are two lines that are parallel in a real world but virtually intersected at a specific point inside the surveillance image.

11. The surveillance apparatus of claim 10, wherein the operation processor is further adapted to divide the plurality of straight lines into a first straight line group and a second straight line group via a reference line of the surveillance image, and the first candidate parallel line and the second candidate parallel line are selected from at least one of the first straight line group and the second straight line group.

12. The surveillance apparatus of claim 10, wherein the operation processor is further adapted to acquire slopes of the plurality of straight lines, set some of the plurality of straight lines that have a slope difference conforming to a slope threshold range as a candidate parallel line assembly, and select the first candidate parallel line and the second candidate parallel line from the candidate parallel line assembly.

13. The surveillance apparatus of claim 12, wherein the operation processor is further adapted to compute the parameter difference between the reference point and a mode number of angles derived from several intersection points when several candidate parallel line of the candidate parallel line assembly are intersected to generate the foresaid intersection points.

14. The surveillance apparatus of claim 10, wherein the operation processor is further adapted to detect a moving object within the surveillance image, acquire a first top reference point and a first bottom reference point of the moving object at a first point of time, acquire a second top reference point and a second bottom reference point of the moving object at a second point of time different from the first point of time, and set a connection between the first top reference point and the second top reference point as the first candidate parallel line, and setting a connection between the first bottom reference point and the second bottom reference point as the second candidate parallel line.

15. The surveillance apparatus of claim 14, wherein an appearance difference between a first appearance and a second appearance of the moving object respectively acquired at the first point of time and the second point of time conforms to a deformation threshold range.

16. The surveillance apparatus of claim 10, wherein the operation processor is further adapted to detect a moving object within the surveillance image, acquire a first top reference point and a first bottom reference point of the moving object at a first point of time, acquire a second top reference point and a second bottom reference point of the moving object at a second point of time different from the first point of time, and set a connection between the first top reference point and the first bottom reference point as the first candidate parallel line, and setting a connection between the second top reference point and the second bottom reference point as the second candidate parallel line.

17. The surveillance apparatus of claim 10, wherein the operation processor is further adapted to detect at least two moving objects within the surveillance image, acquire a top reference point and a bottom reference point of each of the at least two moving objects, and set one connection between the top reference point and the bottom reference point of one moving object and another connection between the top reference point and the bottom reference point of another moving object respectively as the first candidate parallel line and the second candidate parallel line.

18. The surveillance apparatus of claim 17, wherein the at least two moving objects within the surveillance image are detected via motion detection technique, and an entire or a part of a region of interest upon each moving object is marked by an identification frame, and one middle point of an upper side and another middle point of a lower side of the identification frame are respectively set as the top reference point and the bottom reference point.

* * * * *